United States Patent [19]

Yao et al.

[11] Patent Number: 4,650,401
[45] Date of Patent: Mar. 17, 1987

[54] FLAT STRAP CRUCIFORM FLEXURE FOR HELICOPTER ROTOR SYSTEMS

[75] Inventors: Samuel S. Yao, Fountain Valley; Charles W. Hughes, Thousand Oaks, both of Calif.

[73] Assignee: McDonnell Douglas Helicopter Company, Mesa, Ariz.

[21] Appl. No.: 482,842

[22] Filed: Apr. 7, 1983

[51] Int. Cl.⁴ .......................................... B64C 27/38
[52] U.S. Cl. ................................. 416/134 A; 416/141
[58] Field of Search .......... 416/134 A, 138 A, 140 A, 416/141, 135 B, 136 A

[56] References Cited

U.S. PATENT DOCUMENTS

| | | | |
|---|---|---|---|
| 3,669,566 | 6/1972 | Bourquardez et al. | 416/138 A X |
| 3,999,887 | 12/1976 | McGuire | 416/134 A |
| 4,008,980 | 2/1977 | Noehren et al. | 416/134 A |
| 4,047,839 | 9/1977 | Ferris et al. | 416/230 A |
| 4,093,400 | 6/1978 | Rybicki | 416/134 A |
| 4,182,597 | 1/1980 | Derschmidt | 416/134 A |
| 4,201,515 | 5/1980 | Derschmidt et al. | 416/134 A |
| 4,222,709 | 9/1980 | Mouille | 416/134 A |
| 4,227,859 | 10/1980 | Gouzien et al. | 416/134 A |
| 4,273,511 | 6/1981 | Mouille et al. | 416/138 A X |
| 4,297,080 | 10/1981 | Krauss et al. | 416/141 |
| 4,306,837 | 12/1981 | Brogdon et al. | 416/134 A |
| 4,332,525 | 6/1982 | Cheney | 416/134 A |
| 4,344,739 | 8/1982 | Derschmidt et al. | 416/134 A X |
| 4,352,631 | 10/1982 | Buchs et al. | 416/134 A |
| 4,369,018 | 1/1983 | Brunsch et al. | 416/134 A |
| 4,381,902 | 5/1983 | Head et al. | 416/500 X |
| 4,427,340 | 1/1984 | Metzger et al. | 416/134 A X |
| 4,455,123 | 6/1984 | Sanders et al. | 416/138 A X |

FOREIGN PATENT DOCUMENTS

2823389 12/1979 Fed. Rep. of Germany ... 416/134 A

*Primary Examiner*—Everette A. Powell, Jr.
*Attorney, Agent, or Firm*—Beehler, Pavitt, Siegemund, Jagger, Martella & Dawes

[57] ABSTRACT

An improved flexure member in a helicopter rotary system is devised wherein the flexure member is made of wound monofilamentary resin impregnated material comprising a fiber matrix and is formed in a flat strap disposed through a rotary hub of the rotor system and integrally extends from the flat strap to form a transition member and then to a cruciform flexure member having an X-shaped cross section. The cruciform member then extends and attaches to an outboard fitting adapted for coupling to the root of a rotor blade. In one embodiment the fiber matrix is wound around cylindrical lugs which forms the outboard fitting in combination with the integral extension of the cruciform member. The cruciform member is particularly characterized by including a woven X-shaped reinforcing fabric disposed within the X-shaped member about which fabric the monofilamentary layers are formed thereby forming each leg of the X-shaped cruciform. The woven reinforcing fabric extends through the center of the X-shaped cross section while the filamentary layers are disposed adjacent only to the legs of the X-shaped cruciform member, thus leaving the center of the X-shaped cruciform member thinned but knitted together by the reinforcing fabric.

18 Claims, 31 Drawing Figures

Fig.9

FLAT STRAP CRUCIFORM FLEXURE FOR HELICOPTER ROTOR SYSTEMS

FIELD OF THE INVENTION

The present invention relates to the field of helicopter rotor systems and more particularly to the flexure elements by which the rotor blades are connected to the rotor hub of such helicopter rotor systems.

DESCRIPTION OF THE PRIOR ART

The flight control characteristics of a helicopter are by and large dictated by the rotor system used. In general, the material components which comprise a rotor system and which determine its performance characteristics include a rotor hub which provides the mechanical coupling between a drive shaft and the rotor blades, the rotor blades which provide the operative rotating airfoils, some means for coupling the rotor blades to the hub such as bearings or flexures, and a control mechanism for controlling the attitude of the blades in flight. The hub, the hub-to-blade connection, and the blades themselves cooperatively act to provide a collective performance relative to the stress, lifetime, resonant structural and aerodynamic properties of the entire rotor system. Often, design concepts will be confined or concerned only with maximizing a performance parameter of one of these components of the rotor system. What is needed is a design which will integrate the disciplines of rotor design, aerodynamics, structures and materials, dynamics and acoustics. What is further needed is a rotor design which optimally applies these disciplines in an integrated manner to reduce life cycle costs, increase reliability, maintainability and survivability; improve performance characteristics such as rotor lift to drag ratios, fuel consumption, high speed manueverability, agility and handling qualities; and reduce rotor weight, rotor noise and vibratory loads.

BRIEF SUMMARY OF THE INVENTION

The present invention is an improvement in a flexure member in a rotary blade system which includes a plurality of blades in a helicopter. The improvement comprises a rotor hub, a flat strap disposed through the rotor hub and extending therefrom, a transition member, cruciform member and outboard fixture member. The transition member extends from the flat strap and has a cross sectional configuration on a first end thereof which is substantially identical to the cross sectional configuration of the flat strap where the transition member and flat strap are adjacent and contiguous. In other words, the transition member and flat strap are smoothly and continuously flared into each other. The cruciform member extends from the transition member, a second end of the transition member opposing the first end of the transition member. The cruciform member has a cross sectional configuration characterized by a plurality of intersecting planes or an X-shape. In addition, the cruciform member includes a reinforcing member which is disposed within the cross sectional configuration of the cruciform member. The reinforcing member is disposed within the cruciform member so as to be located at least at the point of intersection of the intersecting planes characterizing the cross sectional configuration of the cruciform member. The reinforcing member is parallel and adjacent to at least one of these intersecting planes, and in the preferred embodiment has a cross sectional configuration substantially identical to that of the cruciform member. In other words, both the cruciform member and reinforcing member are X-shaped. The cruciform member extends from the transition member to the outboard fixture member. The outboard fixture member is connected to the cruciform member and provides a means for attachment to the blades of the rotor system. By reason of this combination of elements an improved flexure member is derived which is charactertized by high reliability and improved performance and flexibility without sacrifice of any tensile strength. In the illustrated embodiment, the flat strap, transition member and cruciform are formed of resin impregnated, monofilamentary-wound fiber which collectively forms an integral flexure member extending through the hub and forming a cruciform member on each side of the hub.

The present invention and its various embodiments can be better described and understood by considering the illustrated embodiment set forth in the following figures as described in the detailed description.

BRIEF DESCRIPTION OF THE DRAWINGS

The various embodiments of the present invention are better understood by considering the above described Figures, wherein like elements are referenced by like numerals, in light of the following detailed description.

DETAILED DESCRIPTION OF THE PREFERRED EMBODIMENTS

The present invention is a design for a rotor hub system in a helicopter in which the weight of the rotor system, part count, complexity, manufacturing costs, reliability, control integration, damper integration, hub drag, strain for given flapping, feathering and lead-lag blade displacements and motions, failure performance, and level of operating stresses is optimally integrated. The design includes a hub with a flat strap running through the hub and rotor blades connected to the flat strap by means of a resilient cruciform flexure. The flexure has a cruciform shape and is wound from a single filament about an internal reinforcing fabric.

Figure 1:
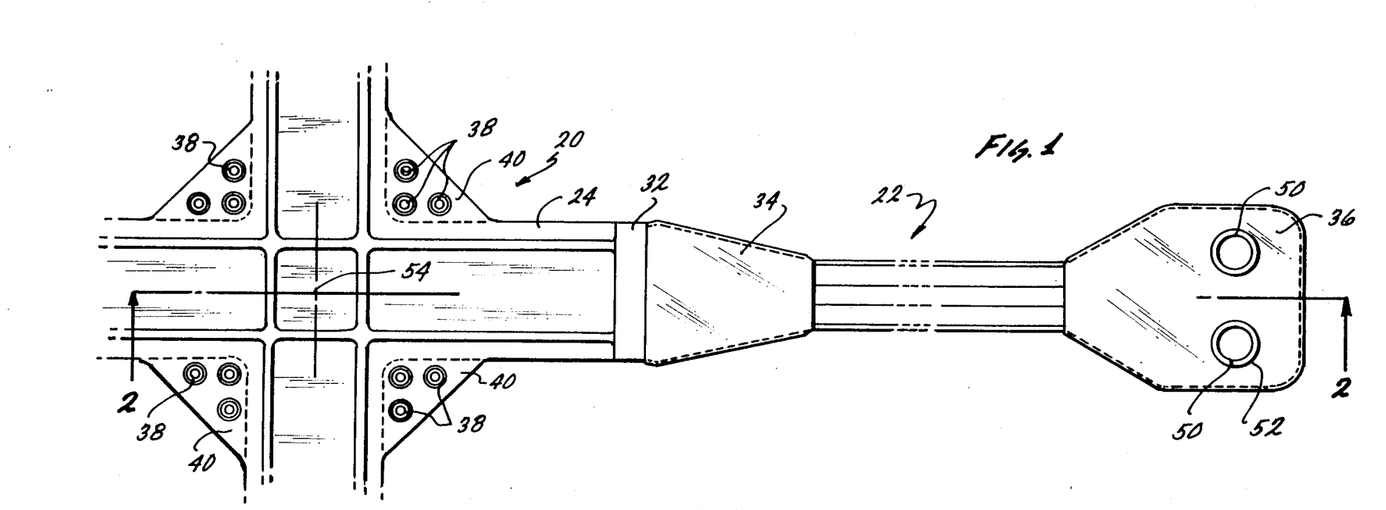
FIG. 1 is a partial plan view of a first embodiment of the flexure and hub devised according to the present invention.

Consider now the invention as illustrated in the flat strap cruciform shown in partial plan view in FIG. 1. A hub, generally denoted by a reference numeral 20, serves as the central point of connection for a pair of flat strap cruciform flexures, generally denoted by reference numeral 22, for a four bladed flexures rotor system (of which only one of the four cruciforms are illustrated). Hub 20, shown in cross sectional, longitudinal view in FIG. 2 taken through line 2—2 to FIG. 1, includes an upper shoe 24 and lower shoe 26. As shown and described in greater detail in connection with FIG. 9, hub 20 is connected to a hub assembly 28 which in turn is connected to a drive shaft 30. Returning now to FIG. 2, a laminated flat strap 32 extends between upper shoe 24 and lower shoe 26 of hub 20 in a continuous manner to ultimately form an opposing cruciform 22. Flat strap 32 extends from hub 20 and flares outwardly in a transition 34 which then extends and forms cruciform 22. Cruciform 22 then extends outwardly and attaches to an outboard lug 36.

Flat strap 32 is tightly pressed between upper and lower shoes 24 and 26 by the clamping action of the shoes provided by a plurality of bolts 38 fastened through corner flanges 40. The peripheral portions of shoes 24 and 26 include curvilinear shaped flapping shoes 42 and 44 which bear against opposing portions of flat strap 32 and permit and serve to define the pivot point of the rotor blade for flapping. Flapping shoes 42 and 44 may also be provided with a suitable layer of elastomeric material disposed on their surface for bearing against flap strap 42 to provide wear and abrasion resistance.

Figure 2:
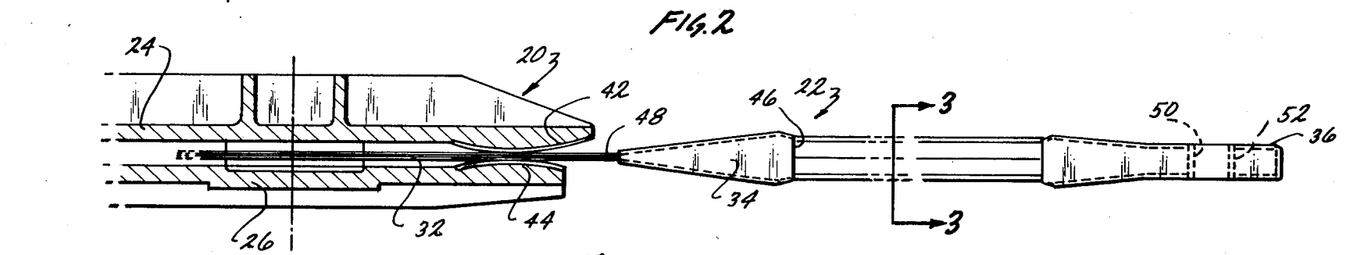
FIG. 2 is a longitudinal sectional view taken through line 2—2 of FIG. 1.

Flat strap 32, transition 34, and cruciform 22 form a single integral piece fabricated according to conventional methods wound from a single filament to form a resin impregnated laminate. In brief, the fiber is impregnated with resin, wound on a jig, and then placed in a mold to assume the configuration as shown in FIGS. 1-3. Flat strap 32 has a generally rectangular cross section which flares outwardly in transition 34 from the solid, rectangular cross section to assume a solid X-shaped form as best illustrated in FIG. 3a taken through line 3—3 of FIG. 2.

Figure 3A:
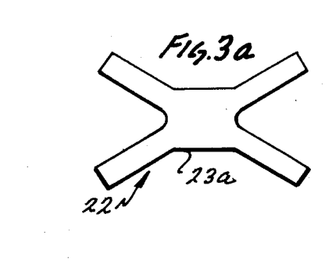
FIG. 3a is a sectional view in enlarged scale taken through line 3—3 of FIG. 2.

FIG. 3a illustrates a cross section taken through cruciform 22. However, transition 34 at end 46 assumes a cross section substantially identical to that shown in FIG. 3a. Transition 34 thus has a continually graduated cross section beginning with a solid rectangular shape at end 48 and flaring outwardly to assume the shape shown in FIG. 3a. The number of fibers within strap pack 32 are continued through transition 34 and cruciform 22. Therefore, the same number of fibers make up the cross section of strap pack 32 as make up transition 34 and cruciform 22. The monofilament fibers are continued through the substantially uniform cross section of cruciform 22 until they reach outboard lug 36, which is a metallic fitting including a pair of bores 50 to which the root of the rotor blade is attached. The fibers from cruciform 22 are wound about a shaped surface 52 which is best illustrated in cross sectional view in FIG. 2 and which provides for the gradual bending of the fibers and their orderly return to cruciform 22. The filaments thus are turned about cylindrical bores 52 inside the hollow fitting of lug 36 and are returned to form the opposing side of cruciform 22, transition 34 and flat strap 32. The construction as shown in FIG. 2 is, of course, extended to the left of centerline 54 of hub 20 to form an identical structure for the opposing rotor blade. The entire strap pack assembly thus comprises a balanced integral structure. A zero net centrifugal force is exerted by the assembly on hub 20 when in operation.

Figure 3B:
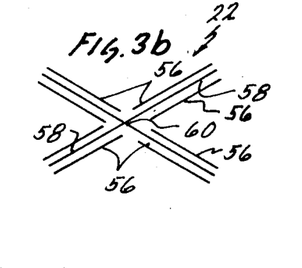
FIG. 3b is a diagrammatic sectional view in enlarged scale taken through line 3—3 of Figure illustrating only the filamentary and reinforcing material in the flexure.

Turn now to FIG. 3b which illustrates the fiber configuration in the cross section of 3a in diagrammatic form. For the purposes of clarity, the resin forming cruciform 22 has not been diagrammatically illustrated in FIG. 3b which symbolically shows in cross sectional view only the lay of monofilament fibers 56 and a woven fiberglass X-shaped fabric 58 which runs the length of cruciform 22 and which fabric 58 provides a woven cross linked center in region 60 of cruciform 22. Resin is then applied to the fabric bundles 56 and woven fabric 58 then placed in a mold so that the overall cross sectional configuration of cruciform 22 becomes that shown in FIG. 3a. However, the structural elements of cruciform 22 are primarily determined by the filaments 56 and fabric 58 which are arranged and configured relative to each other as diagrammatically shown in FIG. 3b.

The reinforcing arrangement shown in FIG. 3b allows the amount of resin and structural fiber in center region 60 of cruciform 22 to be minimized thereby resulting in a much less stiff flexure member. In the prior art, no internal X-shaped fabric was used and the exterior layers X-shaped filaments 56 were bound together at center region 60 simply by resin and by exterior reinforcing plies of fabric applied to the outside of filamentary layers 56 to connect each of the separate filamentary layers 56 much the same way as adhesive tape is used to bind together flaps of cardboard box. This not only led to a thicker and much stiffer center, but also to a structure that resulted in failure at center 60 of the flexure when the lamination between the reinforcing plies between filamentary layers 56 failed. Without some type of reinforcement, the resinous material in the center region 60 would eventually crack resulting in failure of cruciform 22. The present invention as embodied in FIG. 3b meets each of these shortcomings and provides a much softer flexure which is highly reliable.

Figure 3C:
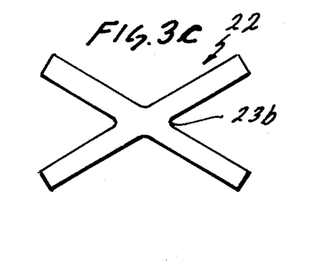
FIG. 3c is a cross-sectional view in enlarged scale of a second embodiment of the cruciform flexure taken through line 3—3 of FIG. 2.

FIG. 3c is a sectional view of a second embodiment shown in enlarged scale taken through line 3—3 of FIG. 2 wherein cruciform 22 is molded without a reinforced center portion 23b as shown in FIG. 3a. In other words, the fiber matrix is laid in the mold and formed so that each of the arms of cruciform 22 intersect to form a center 23b having a thickness approximately equal to the thickness of the arms of the cruciform.

Figure 3D:
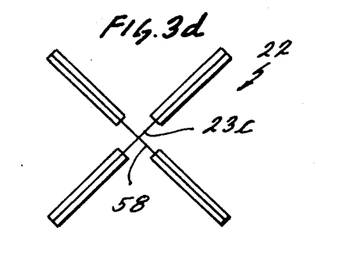
FIG. 3d is a cross-sectional view in enlarged scale of a third embodiment of the cruciform flexure taken through line 3—3 of FIG. 2.

FIG. 3d is a similar cross-sectional view in enlarged scale taken through line 3—3 of FIG. 2 showing a third embodiment of cruciform 22 wherein center 23c is left completely unreinforced by the molded fiber matrix and only a lightly resin impregnated fabric 58 as described in connection with FIG. 3b is left to form center 23c of the third embodiment.

Figure 4:
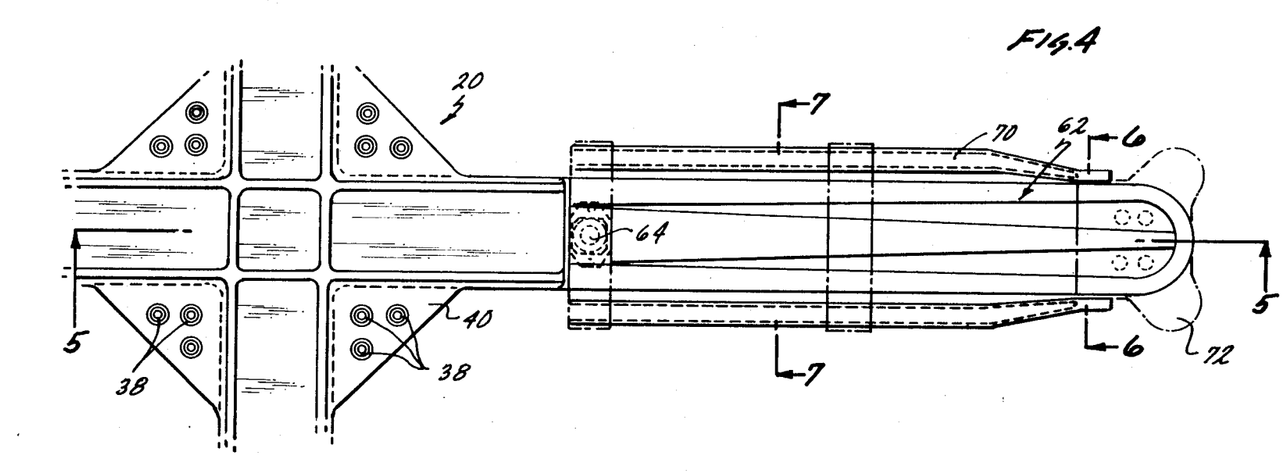
FIG. 4 is a partial plan view of a second embodiment of the present invention.

Turning now to FIGS. 4–7, a fourth embodiment of the present invention is shown wherein a tapered cruciform, generally denoted by reference numeral 62 is illustrated. Again, hub 20 as shown in partial plan view in FIG. 4 provides the attachment point for the rotor system. Flat strap 32 extends from shoes 24 and 26 through a conventional elastomeric snubber 64 which bears against strap pack 32 at one end 66 and is connected at its opposing end 68 to a conventional pitch case 70. Pitch case 70 extends outwardly and terminates in an outboard fitting 72.

Figure 5:
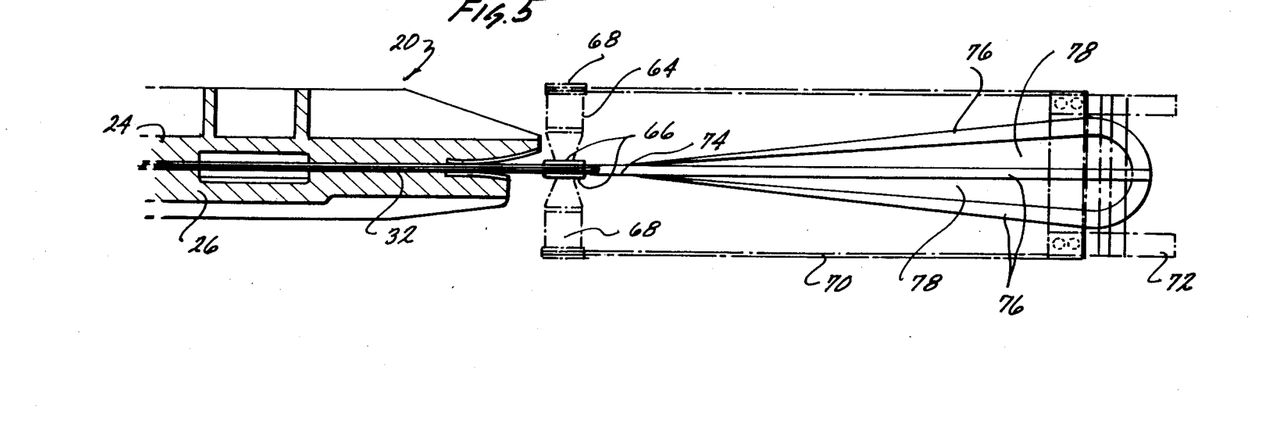
FIG. 5 is a sectional view taken through line 5—5 of FIG. 4.
Figure 6:
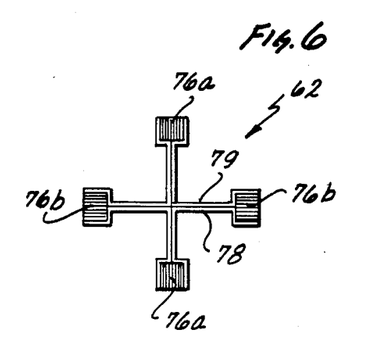
FIG. 6 is a sectional view taken through line 6—6 of FIG. 4.
Figure 7:
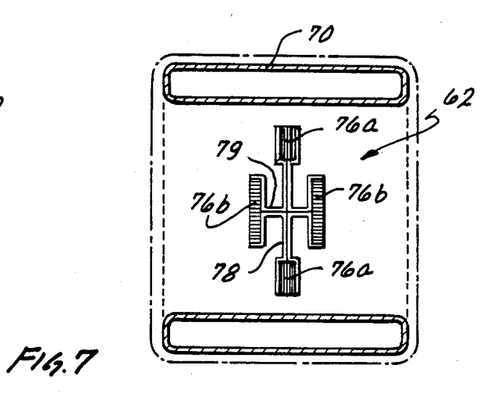
FIG. 7 is a sectional view taken through line 7—7 of FIG. 4.

Again, flexure 62 is integral with flat strap 32 and is an integral wound monofilament resin impregnated structure made according to conventional processes. The filaments form a generally solid rectangular cross section up to point 74 after which, as they extend outwardly, they are formed into a gradually tapered X-shaped cross section of the type better illustrated in FIG. 6 taken through line 6—6 near the outboard end of cruciform 62 adjacent outboard fitting 72, and by the cross sectional view of FIG. 7 taken through line 7—7 of FIG. 4. Generally, cruciform 62 thus assumes the shape of a dihedrally formed baseball bat. FIG. 6 illustrates the outermost cross section as being of generally equal extent in the vertical and horizontal directions with a majority of wound fibers forming four symmetrically disposed longitudinally filled ribs 76a and 76b. As in the case of the embodiment of FIGS. 1–3, the X-shaped web 78 extending between ribs 76a and 76b is formed about a woven X-shaped fabric 79 which has a tapered longitudinal cross section to match the taper illustrated in FIG. 5. FIG. 7 illustrates that the cross section of cruciform 62 becomes substantially more horizontal and flattened as it approaches point 74. For example, horizontal ribs 76a remain separated by substantially the same distance throughout the entire length of cruciform 62 and become somewhat more flattened or rectangular in the horizontal plane, while vertical ribs 76b move closer together, the amount of web with 78 therebetween shortening. In addition, ribs 76b flatten in an even more accentuated manner than ribs 76a. Thus, moving from the most outboard end shown in cross section in FIG. 6 taken through at line 6—6 of FIG. 4 toward the section shown in FIG. 7 taken through at line 7—7 of FIG. 4, ribs 76a and 76b depart from their generally square cross section at line 6—6 and begin to horizontally flatten as point 74 is approached. Ribs 76b continue to move inwardly toward each other and all of the ribs continue to flatten in the horizontal aspect until they reach point 74 at which point they have merged to form a solid rectangular cross section in the horizontal plane identical or substantially identical to the cross section of the flat strap 32. Woven reinforcing fabric 79 within webbing 78 is trimmed to size according to the taper as illustrated in FIGS. 5–7 by trimming a uniform symmetric X-shaped woven fabric to the taper required.

Figure 10:
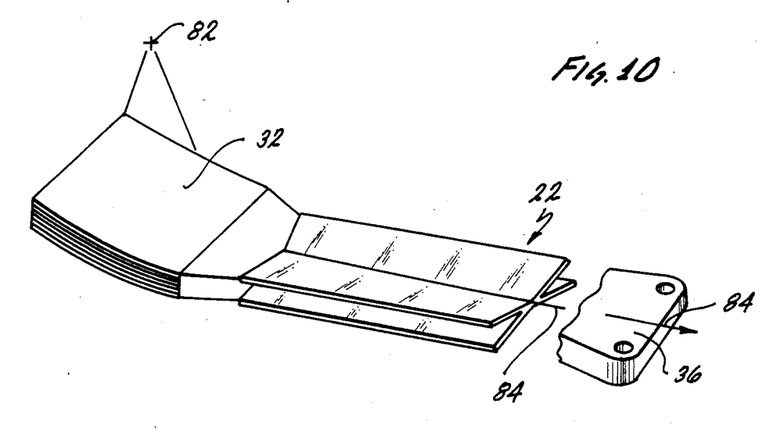
FIG. 10 is a diagrammatic perspective view of a cruciform flexure formed according to the present invention.

Turn now to FIG. 10 which shows a perspective diagrammatic view of a portion of a flexure member devised according to the present invention, and in particular, the first embodiment of FIGS. 1–3, where the flexure geometry and loads are illustrated. Most of the flapping motion required of the blade is provided by flat strap 32 extending from hub 20. The virtual hinge pin for flapping is defined about axis 82 and laminations within flat strap 32 serve to reduce flapping stress. Meanwhile, cruciform 22 primarily provides most of the feathering displacement required for the rotor blades about longitudinal axis 84 of the flexure. The distribution of the torsional displacement along cruciform 22 provides a minimum sheer strain to the structure. However, longitudinal strain in minimal along longitudinal axis 84 through outboard fixture 36 and the flexure of the present invention provides a very stiff flexure element to centrifugal stresses. Lead-lag displacements are provided by combined displacements of both flat strap 32 and cruciform 22. As described in greater detail in connection with FIGS. 11–16, the flat strap cruciform combination of the present invention can also be designed with a pretwist for flap-lag couplings.

Figure 8:
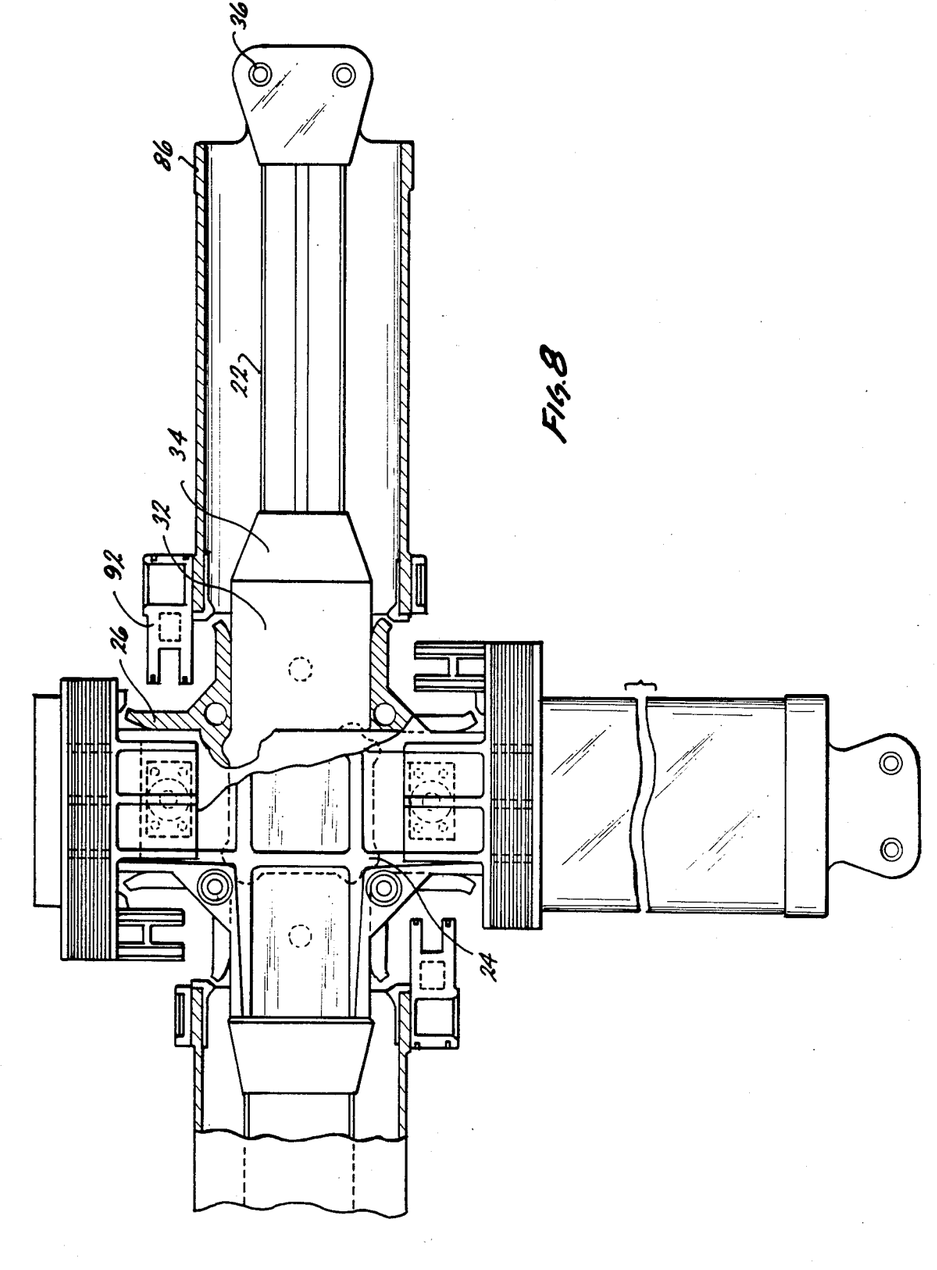
FIG. 8 is a partial plan view of a hub system incorporating the first embodiment shown in FIGS. 1-3.
Figure 9:
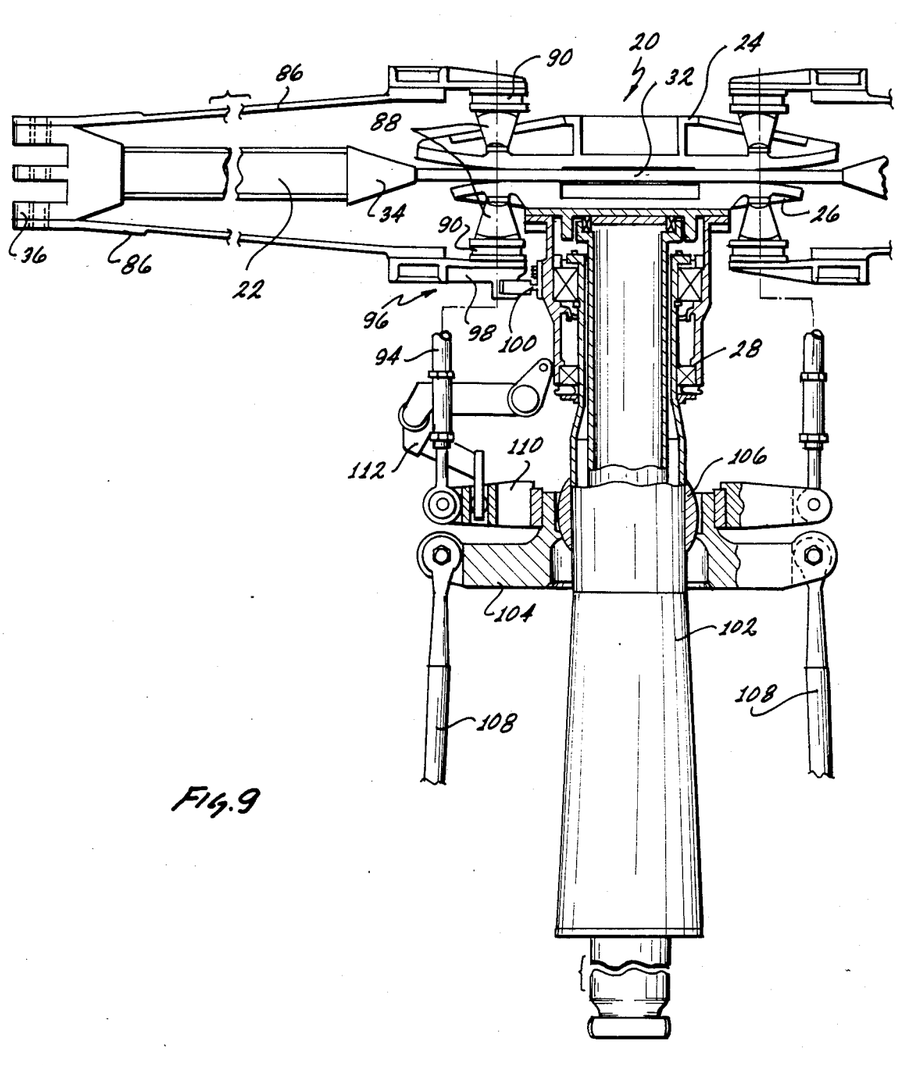
FIG. 9 is a partial cutaway side view of the hub system of FIG. 8.

Consider now an entire hub system with the flat strap cruciform structure of the present invention, and particularly the first embodiment of FIGS. 1–3 as best shown in FIGS. 8 and 9. FIG. 8 is a partial plan view of the hub system showing cruciform 22 and outboard lug 36 housed within a fiber matrix pitch case 86. Fiber matrix is defined throughout this specification to include any structure comprised of fibers of graphite, glass, Kevlar-29, Kevlar-49 and boron set in a binder or resin matrix. However, other fibers and matrices now known or later devised are also clearly within the meaning of the term, "fiber matrix". Pitch case 86 is coupled to hub 20 by means of a pair of conventional elastomeric snubbers 88 and an elastomeric damper 90, best shown in longitudinal section in FIG. 9. Lower portion of pitch case 86 is provided with a droop-stop assembly of conventional design in order to limit the degree of static droop of the rotor blades when not in operation. The droop-stop assembly 96 extends from a lower receiving fitting 98 on the lower surface of pitch case 86 to an inserted stop 100 connected to hub assembly 28. A pitch horn 92 is provided at the inboard end of pitch case 86 and is connected in a conventional manner (not shown) to a pitch assembly 94 of which the lower part is shown in cutaway view in FIG. 9. Pitch or feathering is thus transmitted from pitch link assembly 94 to pitch horn 92, thence to pitch case 86 and outboard lug 36 to the root of the rotor blade.

Consider briefly the remaining control portions illustrated in FIG. 9 for the control of the rotor blade system. Hub assembly 28 is rotatably journalled in a conventional manner to a stationary external mast 102. Rotor hub assembly 28 as described above in turn is fixed or splined to an internal drive shaft 30 and thence is fixed in a conventional manner to hub 20 to impart the rotary motion to the rotor blade system. However, all overall torques or moments are transmitted from hub 20 through hub assembly 28 to stationary mast 102.

A stationary swash plate 104 is rotatably coupled to mast 102 by conventional ball joint 106. The planar inclination of stationary swash plate 104 in turn is controlled by link assembly 108 of which only the upper portion of the control arms are illustrated. A rotating swash plate 110 is rotatably journalled to stationary swash plate 104 and assumes the same planar inclination as stationary swash plate 104. However, rotating swash plate 110 is connected to rotating hub assembly 28 by scissor assembly 112. Collective pitch control is provided by translation of stationary swash plate 104 along the longitudinal direction of stationary mast 102 together with ball joint 106. Relatively small displacements are required and a short cylindrical segment of mast 102 accommodates the entire range of collective of collective pitch adjustements.

The integrated system such as shown in FIGS. 8 and 9 have been illustrated in an untwisted configuration which is representative of cruise flight. The untwisted configurations which are illustrated in FIGS. 1–9 are accomplished by initially fabricating a predesigned nose-up pretwist at the blade root equal to the estimated collective pitch of the rotor system at cruise flight. Since the blades are fabricated from composite materials, the pretwist at the blade root can be effected easily with conventional methodology. The pretwist minimizes the mean torsional stresses of the flat strap 32 and also minimizes the frontal area of the pitch case during cruise flight thereby lowering the overall hub drag.

Figures 11, 12, 13, 14, 15, 16:
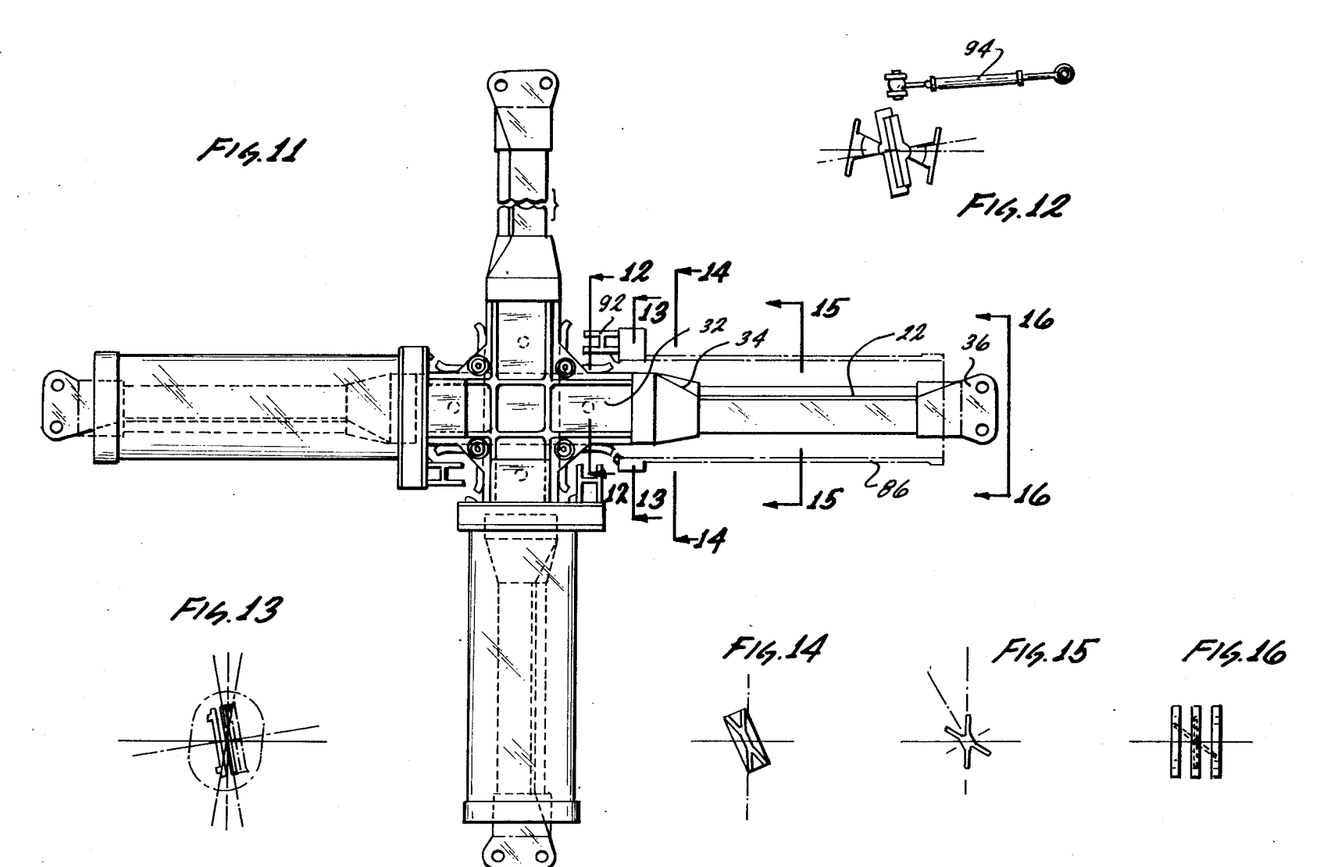
FIG. 11 is a plan view of a flexure device according to a third embodiment of the present invention with a designed pretwist for flat lag couplings.
FIG. 12 is a sectional view taken through line 2—2 of FIG. 11.
FIG. 13 is a sectional view taken through line 13—13 of FIG. 11.
FIG. 14 is a sectional view taken through line 14—14 of FIG. 11.
FIG. 15 is a sectional view taken through line 15—15 of FIG. 11.
FIG. 16 is an end view taken through line 16—16 of FIG. 11.

FIGS. 11–16 illustrate a fifth embodiment of the present invention wherein flap-lag and pitch-lag couplings are incorporated into the design. FIG. 11 shows in partial plan view a modified version of the flexure illustrated in FIGS. 1–3 as shown in an integrated system of the type illustrated in FIGS. 8 and 9.

Pitch link coupling is obtained by canting pitch link 94 shown in FIG. 12 relative to pitch horn attachment 92. Flap-lag coupling is achieved by pretwisting the flexure. Pretwist occurs at two portions along the flexure member, namely both in flat strap 32 and cruciform 22. Flat strap pretwist is as set at 10 degrees as shown in the sectional view taken through line 12—12 of FIG. 11 and as illustrated in FIG. 12. The flat strap pretwist allows the center portion of the attachment between the flexure and hub to remain flat and to permit the pretwist to take place between hub shoes 26 and 24. This allows a thin hub profile to minimize hub air drag. An additional pretwist of 20 degrees is also provided in transition 34 between flat strap 32 and cruciform 22 as better illustrated in the sectional view of FIG. 14 taken through line 14—14 of FIG. 11. This pretwist is formed during the layup and molding process utilizing conventional processes. Therefore, the total pretwist for the flexure is 30 degrees. A large flap-lag coupling is provided so that the coupling does not "wash out" due to centrifugal force and other blade loads applied to flexure during flight. This is particularly necessary in the case where a soft flexure of the type which characterizes X-shaped cruciform 22 is used. The angles listed above as set forth are examples only and it must be explicitly understood that many other angular magnitudes could be substituted according to the teachings of the invention.

Pitch-flap and flap-lag couplings are beneficial for rotor stability both for air and ground resonance conditions. The flap-lag couplings also have a pronounced effect on rotor dynamics. Although the relationship of such couplings is primarily an application of known principles of aerodynamic theory, a designed pretwist has been illustrated in connection with FIGS. 11–16 to demonstrate the ease by which such couplings can be incorporated into a rotor system using the present invention.

Figures 17, 18:
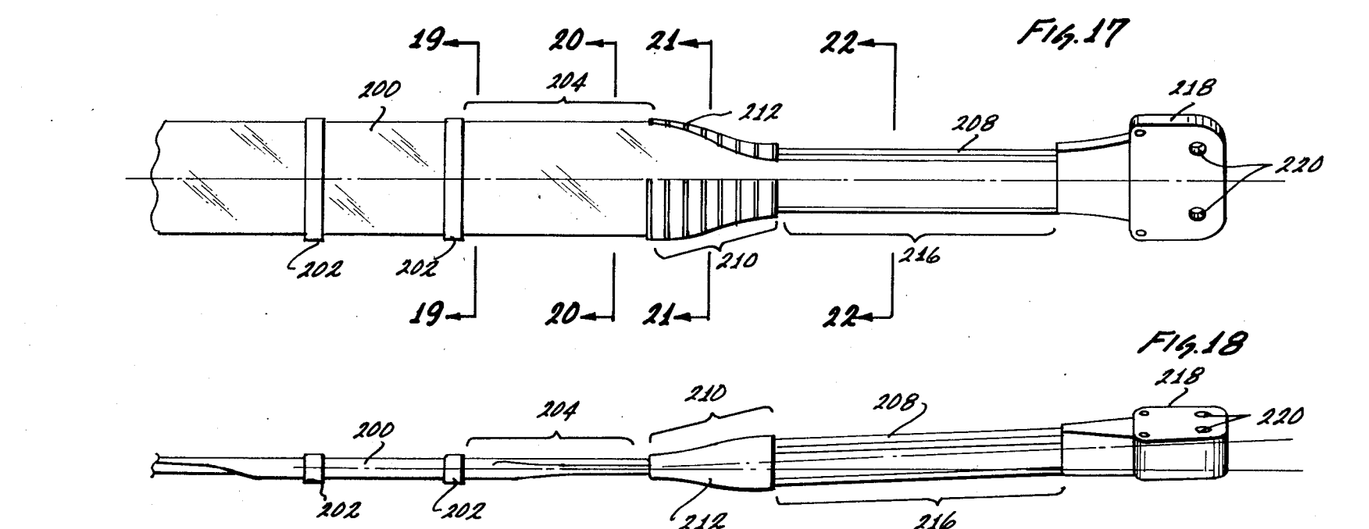
FIG. 17 is a partial elevational plan view of a fourth embodiment of the present invention.
FIG. 18 is a side elevational view of the fourth embodiment of FIG. 17.
Figure 19:
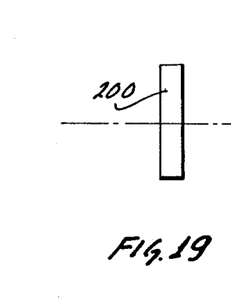
FIG. 19 is a cross-sectional view taken through line 19—19 of FIG. 17.
Figure 20:
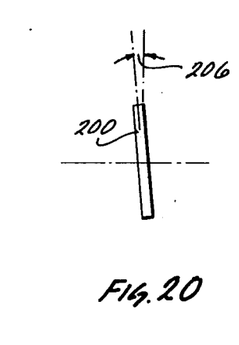
FIG. 20 is a cross-sectional view taken through line 20—20 of FIG. 17.
Figure 21:
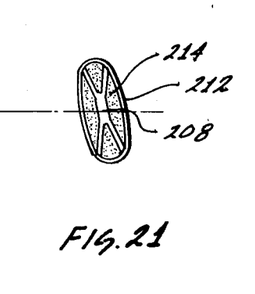
FIG. 21 is a cross-sectional view taken through line 21—21 of FIG. 17.

Turning now to FIG. 17, a partial plan view of a flat strap and cruciform showing a sixth embodiment of the present invention is illustrated in elevational view. Whereas in each of the previously illustrated and described embodiments the flat strap was comprised of laminations of fiber matrix, flat strap 200 of the sixth embodiment of FIG. 17 is a solid strap of substantially uniform cross-sectional composition wherein continuously wound and tapered plies of fiber matrix have been molded to form an integral mass. Flat strap 200 is characterized by a central portion which is disposed within the hub, better illustrated and described in connection with FIGS. 23 and 24 and not shown in FIGS. 17 and 18. Hoop wound filamentary resin impregnated straps 202 are bonded to each end of the central portion of flat strap 200 beyond which, flat strap 200 extends to a transition region 204 in which a pretwist is formed, similar to that described above in connection with the embodiment of FIGS. 11–16. As better illustrated in the cross-sectional views of FIGS. 19 and 20 taken through lines 19—19 and 20—20 of FIG. 17 respectively, the cross-sectional area of the solid flat strap 200 decreases from section line 19-19 toward section line 20—20. The decrease in bulk is accomplished by the use of tapered plies of fiber matrix material so that the structural integrity and density of the fiber matrix material composing flat strap 200 is substantially uniform throughout. As shown by comparison of the sectional views in FIGS. 19 and 20, an approximately a five degree twist is accommodated in transition portion 204 of flat strap 200 as the flat strap thins. The X-shaped cruciform 208 is formed beginning in transition region 210 as most graphically depicted in FIG. 21 taken through line 21—21 of FIG. 17. A resin impregnated filamentary hoop wound band 212 is provided and bonded across flat strap 200 and cruciform 208 in transition region 210 for reinforcement. In addition, the interstitial space between the forming arms of the X-shaped cruciform 208 are filled with matrix binder 214 to provide further rigidity as best illustrated in FIG. 21. Further out on cruciform 208, the separated X-shaped cross section of cruciform 208 is assumed and uniformly extended through region 216 depicted in FIG. 17 and better illustrated in cross sectional view in FIG. 22 taken through line 22—22 of FIG. 17. Cruciform 208 includes inner reinforcing fabric 58 as described in connection with the embodiments above and in particular illustratively assumes the specific cross-sectional form as described in connection with FIG. 3a. The outer end of cruciform 208 terminates in a metal fitting 208 including bores 220 to which the rotor blade (not shown) is bolted and around which the continuous filamentary material comprising cruciform 208 are wound and molded. Additional matrix binder is filled within outboard fitting 218 to provide further rigidity and fill any open spaces between the wound filaments which are disposed within outboard fitting 218.

Figure 22:
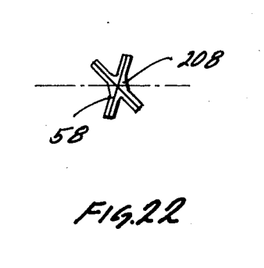
FIG. 22 is a cross-sectional view taken through line 22—22 of FIG. 17.

The pretwist within the flexure continues through cruciform 208 such that at section line 22—22 a pretwist of fifteen degrees is assumed. FIG. 18 illustrates the embodiment of FIG. 17 in side elevational view and pictorially shows the pretwist between the center portion of flat strap 200, which is shown exactly edge-on in FIG. 18 and the twist of outboard fitting 218 at the opposite end of the flexure.

Figure 23:
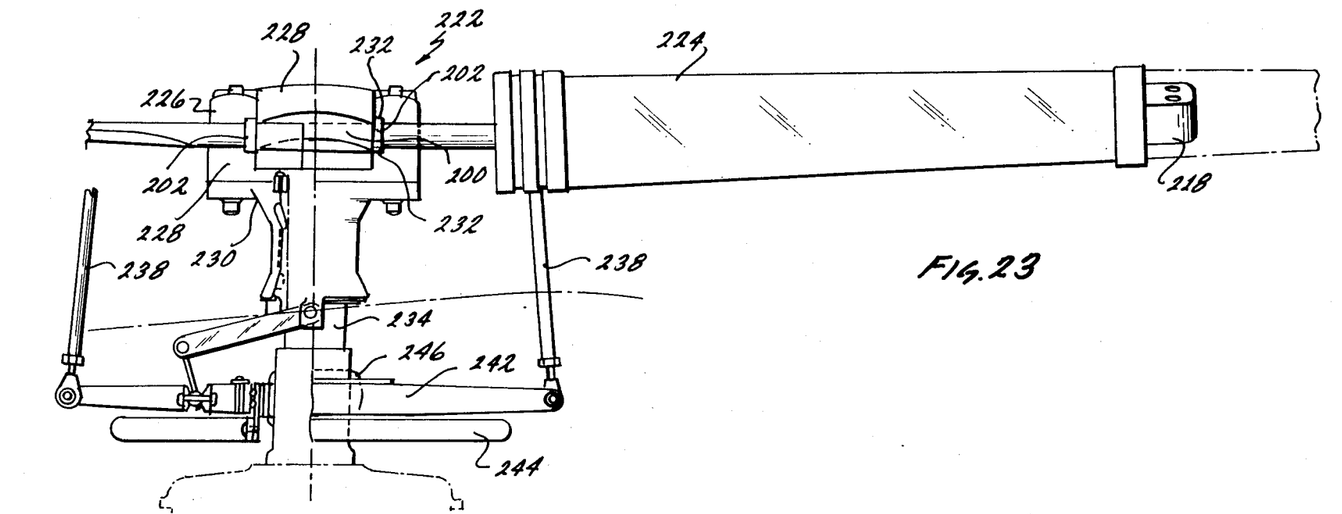
FIG. 23 is a side elevational view of a sixth embodiment of the present invention showing an alternative means of reinforcing the cruciform in an integrally formed outboard fitting.
Figure 24:
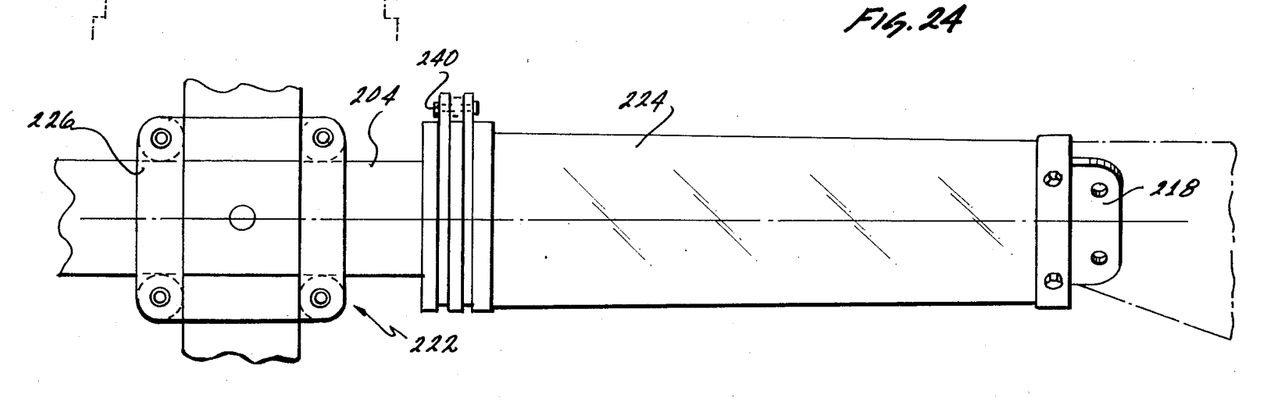
FIG. 24 is a partial elevational plan view of the outboard fitting shown in FIG. 23.

Turning now to FIGS. 23 and 24, the embodiment of the flexure as described in connection with FIGS. 17-22 is shown in a rotor system in combination with a hub, generally denoted by reference numeral 222, and a pitch case 224. Consider first FIG. 23 which is a side elevational view of the rotor system. Hub 222 is comprised of an upper hub plate 226 and a lower hub plate 228. Upper lower hub plates 226 and 228 are through-bolted to a hub barrel 230 as better depicted in plan elevational view of FIG. 24. Sides 228 of upper hub plate 226 are curved or arched as shown in FIG. 23 thereby providing an open box-like structures for a four-blade rotor system as partially depicted in plan view in FIG. 24. Inner recesses 232 are provided on the inner edges of both upper hub plate 226 and lower hub plate 228 into which recesses 232, bands 202 on flat strap 200 are disposed. Thus, bands 202 also provide a means for centering and retaining flat strap 200 within the clamped hubs 222 of FIGS. 23 and 24. The embodiment of FIGS. 23 and 24 differs primarily from the prior embodiments in that hub 222 is a clamped or rigid hub and does not include the curved shoes 42 and 44 of the embodiment of FIGS. 1 and 2. Therefore, most of the flexing within the flexure occurs outboard of hub 222.

Also illustrated in FIG. 23 are the conventional elements of a rotor system including rotor shaft 234, hub scissors 236 and pitch control links 238 coupled between pitch horn 240 illustrated in FIG. 24 and rotating swash plate 242 illustrated in FIG. 23. Rotating swash plate 242 and fixed swash plate 244 are coupled by means of a ball joint 246 as is conventional in the art. Finally, pitch case 224 includes an elastomeric snubber (not shown) between pitch case 224 and transition region 204 of the flexure in the proximity of pitch case 224 near pitch horn 240. Pitch case 224 is a filamentary space wound pitch case and extends to and is bolted to outboard fitting 218. The flexure as illustrated in connection with FIGS. 17 and 18 is housed within pitch case 224 and is coupled thereto only by means of the elastomeric snubber at the end of pitch case 224 nearest hub 222 and by direct coupling with outboard fitting 218 at the opposing end.

Figures 25, 26, 27, 28:
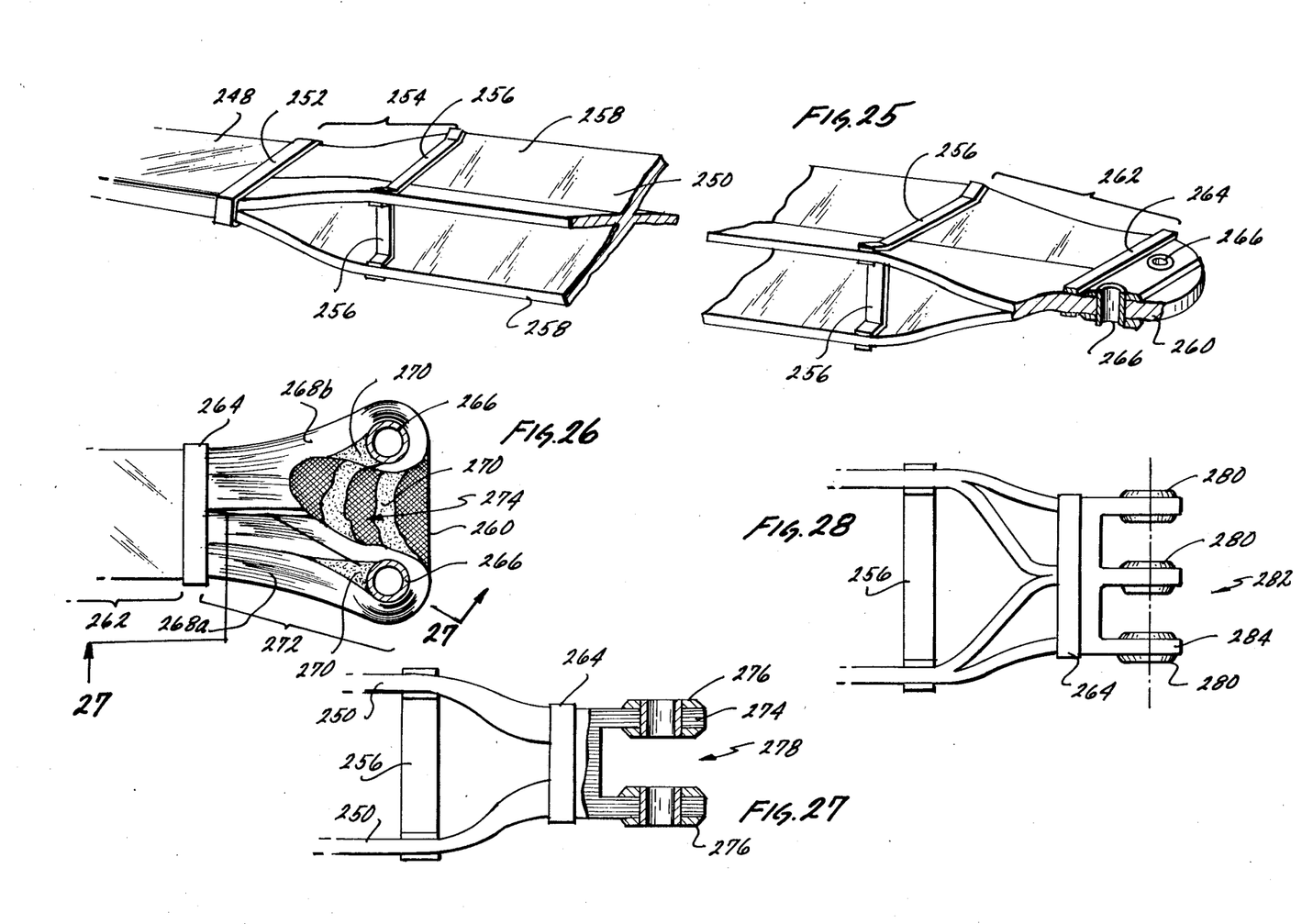
FIG. 25 is a partial perspective view of a seventh embodiment of the invention.
FIG. 26 is a partially cut-away plan view of the outboard fitting of FIG. 25.
FIG. 27 is a partially cut-away side elevational view of anotoher embodiment of the outboard fitting.
FIG. 28 is a side view of yet another embodiment of the outboard fitting.

Turning now to FIG. 25, another embodiment of the flexure of the present invention is illustrated wherein flat strap 248, which may either be laminate or solid in form, integrally transitions to X-shaped cruciform 250 without the reinforcement provided by a matrix filled hoop wound band, such as band 212 shown in FIGS. 17 and 18. A thinner single hoop-wound band 252, which does provide the same reinforcing support as band 212 of the embodiment of FIGS. 17 and 18 is bonded to the flexure at the outermost end of flat strap 248 just before it begins to transition into the X-shaped cross section of cruciform 250 in region 254. At the end of transition region 254 where the uniform X-shaped cross section of cruciform 250 is first achieved, a plurality of C-shaped brackets 256 are bonded between adjacent arms 258 of the X-shaped cruciform 250 to provide structural reinforcement and rigidity and yet to allow for a more flexible flexure than that previously described in the above embodiments. C-shaped brackets 256 are made of fiber matrix material and bonded by conventional means between each of the adjacent arms 258 at each end of X-shaped cruciform 250. In other words, four such brackets 256 are provided at the end of cruciform 250 nearest the hub or flat strap 248, and an additional set of four such brackets are bonded at the opposing end of cruciform 250 nearest outboard end 260. Hoop winds similar to 252 could also be applied around brackets 256. A similar transition region 262 is formed between the end of the uniform cross section of cruciform 250 wherein each of the four arms taper to a single element at end 260. A hoop wound reinforcing band 264 similar to band 252 is provided at the outboard end of transition region 262.

The embodiment of FIG. 25 is further distinguished from each of the previously described embodiments by including an integrally formed outboard end 260. As shown in partial cross-sectional view in FIG. 25, outboard end 260 includes two metallic cylindrical bushings 266 configured for bolted attachment to the root end of the rotor blade (not shown). As better illustrated in plan view in FIG. 26, the continuous fibers within cruciform 250 are integrally extended and wrapped around cylindrical bushings 266 so that the entire outboard end 260 of the flexure is formed of fiber matrix material and binder with the exception only of metallic bushings 266. However, it must be understood that metallic bushings 266 could, if appropriate, be replaced by fiber matrix bushings of similar shape. The divided fibers form two loops 268a and 268b. Loops 268a and 268b are thus open and splayed to form the required spread and distance between bushings 266. The voids between the loops are filled with binder or matrix material 270 together with layers of laminated fiber matrix. The fiber matrix layers are laid in a horizontal plane perpendicular to the longitudinal axis of bushings 260 and are cut to have a plan cross section as shown in FIG. 26 to be identical to that of end 260. Such fabric layers are laminated and extend through the fiber windings forming loops 268a and 268b.

Such horizontally laid and laminated fiber matrix layers 274 are better shown in cross-sectional view taken through line 27—27 of FIG. 26 and shown in the context of a second embodiment of end 260 wherein bushings 266 are divided and an upper and a lower bushing 276 are provided a doubly opened end, generally denoted by reference numeral 278. A plurality of fiber matrix laminations are then cut appropriately in plan outline depending upon the position of laminate layer 274 within end 278 as diagrammatically illustrated in the partial cut-away view shown of end 278 in FIG. 27.

FIG. 28 illustrates a similar cross sectional view of a third embodiment of the integrally formed end wherein a pair of triplet metallic bushings 280 comprise an end generally denoted by reference numeral 282. The fiber matrix material comprising the flexure again are integrally extended and wound around bushings 280 which are shown in partial cross-sectional view taken through a section similar to that of line 27—27 shown in FIG. 26 with the end 282 being substituted for end 260 previously described. The embodiment of FIG. 28 differs from the embodiment of FIGS. 25 and 26 in that the layers which have been combined to form a single layered end 260 of that embodiment are separated into three sections in the embodiment of FIG. 2 and in two sections of the embodiment of FIG. 27 in a jig prior to the molding process and cured to assume the form shown in the Figures. Again, the embodiment of FIG. 28 includes a plurality of fiber matrix laminated layers 284 diagrammatically illustrated in FIG. 28 and cut with a plan outline as appropriate to their disposition vertically within the section shown in FIG. 28 to further reinforce and provide rigid structure for end 282. It has been determined that such laminated wound ends are stronger than conventional metal fittings and when and if they fail, they fail gracefully by breakage of single fibers rather than by catastrophic crack propagation as is the case with metal fittings.

Therefore, it must be understood that many modifications and alterations may be made by those having ordinary skill in the art without departing from the spirit and scope of the present invention. The precise form assumed by the flexure member can thus be customized to the dynamics of the rotor system in question by the application of well understood aerodynamic principles applied to the flexure designed according to the present invention as taught herein. The illustrated embodiment has been shown here only for the purposes of clarification and example and should not be taken as limiting the invention as defined in the following claims.

We claim:

1. An improvement in a flexure member in a rotary blade system including a plurality of blades comprising:
   a rotor hub;
   a flat strap disposed through said rotor hub and extending therefrom;
   a transition member extending from said flat strap and having a cross-sectional configuration on a first end thereof substantially identical to said flat strap where said tranistion member and flat strap are adjacent;
   a cruciform member extending from said transition member at a second end of said transition member opposing said first end of said transition member, said cruciform member having a cross-sectional configuration characterized by a plurality of intersecting planes, said cruciform member including an intergral, nonshear bearing reinforcing fabric member disposed therein such that in cross-sectional configuration said reinforcing member is disposed therein at least at the point of intersection of said intersecting planes and is parallel and is disposed in at least part of each of said planes, said cruciform member extending from said transition member; and
   an outboard fixture means connected to said cruciform member for providing attachment to said blades of said rotary blade system,
   whereby an improved flexure member is provided which is characterised by high reliability, and improved performance and flexibility.

2. The improvement of claim 1 wherein said reinforcing member is woven knitted fabric having a cross-sectional configuration similar to said cruciform member and disposed therein.

3. The improvement of claim 2 wherein said cruciform member is made of filamentary wound resin impregnated material and wherein said reinforcing member is disposed within said cruciform member with said filamentary wound material disposed on opposing sides of said reinforcing member, said reinforcing member being disposed therebetween.

4. The improvement of claim 3 wherein said wound filamentary material is disposed only partially on said reinforcing member leaving that portion of said reinforcing member disposed at said point of intersection of said intersecting planes without wound filamentary material disposed thereover.

5. An improvement in a flexure member in a rotary blade system including a plurality of blades comprising:
   a rotor hub;
   a flat strap disposed through said rotor hub and extending therefrom;
   a transition member extending from said flat strap and having a cross-sectional configuration on a first end thereof substantially identical to said flat strap where said transition member and flat strap are adjacent;
   a cruciform member extending from said transition member at a second end of said transition member opposing said first end of said transition member, said cruciform member having a cross-sectional configuration characterized by a plurality of intersecting planes, said cruciform member including a reinforcing member disposed therein such that in cross-sectional configuration said reinforcing member is disposed therein at least at the point of intersection of said intersecting planes and is parallel and adjacent to at least part of one of said planes, said cruciform member extending from said transition member; and
   wherein said plurality of intersecting planes configuring said cruciform member includes two intersecting planes forming in combination an X-shaped cruciform member, said reinforcing member disposed therein also having an X-shape, said reinforcing member extending in a continuous manner to the center of said x-shape,
   an outboard fixture means connected to said vruciform member for providing attachment to said blades of said rotary blade system,
   whereby an improved flexure member is derived which is characterized by high reliability, and improved performance and flexibility.

6. The improvement of claim 5 wherein said reinforcing member is woven fabric forming an integral X-shaped member.

7. The improvement of claim 6 wherein said flat strap, transition member and cruciform member are formed as an integral structure of wound filamentary resin-impregnated material with said reinforcing member disposed within said cruciform member with said filamentary wound material disposed on opposing sides of said reinforcing member, said reinforcing member being disposed therebetween.

8. The improvement of claim 7 wherein said wound filamentary material disposed only partially on said reinforcing member leaving the center of said X-shaped reinforcing member free of filamentary material, whereby said cruciform member is rendered substantially more pliable without loss off tensile strength.

9. The improvement of claim 1 wherein said cruciform member has a first end contiguous with said transition member and a second end contiguous with said outboard fixture means and wherein the cross section of said cruciform member is tapered between said first and second ends.

10. An improvement in a flexure member in a rotary blade system including the plurality of blades used in a helicopter comprising:
a rotor hub;
a flat strap disposed through said rotor hub and extending therefrom;
a cruciform member extending at one end from said flat strap and having a cross sectional configuration characterized by a plurality of intersecting planes, said cruciform member including a reinforcing member disposed therein such that in cross sectional configuration said reinforcing member is disposed therein at least at the point of intersection of said intersecting planes and is parallel and adjacent to at least part of one of said planes; and
an outboard fixture means connected to said cruciform member for providing attachment to said blades of said rotary blade system, wherein said cruciform member is contiguous to said flat strap at one end and contiguous to said outboard fixture means at an opposing end of said cruciform member and is tapered therebetween.

11. The improvement of claim 10 wherein said flat strap has a generally compact rectangular cross section and wherein said outboard fixture means has a generally circular cross section, said cruciform member having a cross section of substantially equal dimension to said flat strap where contiguous thereto and of substantially equal dimension to said outboard fixture means where contiguous to said means, said cruciform member being tapered between a larger circular cross section of said ouboard fixture means and a smaller rectangular cross section of said flat strap.

12. The improvement of claim 11 wherein said cruciform member is formed of two intersecting planes forming an X-shaped cross section, said reinforcing member disposed in said cruciform member also having an X-shaped cross section and substantially identical taper between said flat strap and said outboard fixture means as the overall taper of said cruciform member therebetween, said reinforcing member being disposed through the center of said X-shaped cross section.

13. The improvement of claim 12 wherein said reinforcing member is woven fabric and wherein said flat strap and cruciform member are formed as an integral structure of wound filamentary resin-impregnated material.

14. The improvement of claim 13 wherein said reinforcing members disposed within said cruciform member with said filamentary wound material disposed on opposing sides of said reinforcing member, said reinforcing member being disposed therebetween.

15. The improvement of claim 13 wherein said wound filamentary material is disposed only partially on said reinforcing member leaving that portion of said reinforcing member disposed at the center of said X-shaped cross section of said cruciform without wound filamentary material disposed thereover.

16. The improvement of claim 10 wherein said cruciform member has a predetermined angle of twist uniformly distributed along its length so that cross section of said cruciform member contiguous of said flat strap is rotated through said predetermined angle when compared to the cross section of said cruciform member contiguous with the said outboard fixture means. Please add the following claim.

17. An improvement in a flexure member in a rotary blade system including a plurality of blades comprising:
a rotor hub;
a flat strap disposed through said rotor hub and extending therefrom;
a transition member extending from said flat strap and having a cross-sectional configuration on a first end thereof substantially identical to said flat strap where said tranistion member and flat strap are adjacent;
a cruciform member extending from said transition member at a second end of said transition member opposing said first end of said transition member, said cruciform member having a cross-sectional configuration characterized by a plurality of intersecting planes, said cruciform member including an intergral, nonshear bearing reinforcing fabric member disposed therein such that in cross-sectional configuration said reinforcing member is disposed therein to extend in a continuous manner to the point of intersection of said intersecting planes, said reinforcing member being parallel to and disposed in each of said planes, said cruciform member extending from said transition member; and
an outboard fixture means connected to said cruciform member for providing attachment to said blades of said rotary blade system,
whereby an improved flexure member is provided which is characterized by high reliability, and improved performance and flexibility.

18. The improvement of claim 17 said cruciform member further includes an exterior reinforcing member disposed and attached between each adjacent one of said plurality of intersecting planes characterizing said cross-sectional configuration of said cruciform member, said exterior reinforcing member is a C-shaped bracket bonded to opposing and adjacent intersecting planes forming said cruciform member, said reinforcing member attached to said cruciform member near the end of said cruciform member adjacent to said transition member.

* * * * *